US011165733B2

(12) United States Patent
Kuroyanagi

(10) Patent No.: US 11,165,733 B2
(45) Date of Patent: Nov. 2, 2021

(54) INFORMATION PROCESSING SYSTEM TO EXECUTE A PARTICULAR WORKFLOW IN RESPONSE TO RECEIVING MAIL

(71) Applicant: RICOH COMPANY, LTD., Tokyo (JP)

(72) Inventor: Tomohiro Kuroyanagi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/034,018

(22) Filed: Sep. 28, 2020

(65) Prior Publication Data

US 2021/0144113 A1    May 13, 2021

(30) Foreign Application Priority Data

Nov. 13, 2019    (JP) .............................. JP2019-205609

(51) Int. Cl.
*G06F 15/16*    (2006.01)
*H04L 12/58*    (2006.01)

(52) U.S. Cl.
CPC .............. *H04L 51/18* (2013.01); *H04L 51/28* (2013.01); *H04L 51/30* (2013.01)

(58) Field of Classification Search
CPC .......... H04L 51/18; H04L 51/30; H04L 51/28
USPC .................................. 709/206, 219; 726/4, 5
See application file for complete search history.

(56) References Cited

U.S. PATENT DOCUMENTS

| | | | | |
|---|---|---|---|---|
| 9,165,291 | B1* | 10/2015 | Andersen | ............... G06Q 20/40 |
| 2003/0233418 | A1* | 12/2003 | Goldman | ............. G06Q 10/107 709/206 |
| 2005/0188045 | A1* | 8/2005 | Katsikas | ................. H04L 51/12 709/206 |
| 2005/0193076 | A1* | 9/2005 | Flury | ...................... H04L 51/12 709/206 |
| 2009/0044006 | A1* | 2/2009 | Shim | .................... G06Q 10/107 713/151 |
| 2011/0202915 | A1 | 8/2011 | Kuroyanagi | |
| 2012/0023451 | A1 | 1/2012 | Kuroyanagi | |
| 2012/0212761 | A1 | 8/2012 | Kuroyanagi | |
| 2013/0100475 | A1 | 4/2013 | Kuroyanagi | |
| 2013/0329245 | A1* | 12/2013 | Nishida | ................. G06F 3/1288 358/1.14 |
| 2014/0204416 | A1 | 7/2014 | Kuroyanagi | |
| 2014/0376054 | A1 | 12/2014 | Kuroyanagi | |
| 2015/0293728 | A1 | 10/2015 | Nishimura et al. | |
| 2016/0080588 | A1 | 3/2016 | Sasaki et al. | |
| 2016/0274824 | A1 | 9/2016 | Sasaki et al. | |
| 2016/0274842 | A1 | 9/2016 | Kuroyanagi et al. | |
| 2016/0277603 | A1 | 9/2016 | Aoki et al. | |
| 2016/0344878 | A1* | 11/2016 | Asthana | ................ G06F 3/1226 |

(Continued)

FOREIGN PATENT DOCUMENTS

JP    2017-211894    11/2017

*Primary Examiner* — Johnny B Aguiar
(74) *Attorney, Agent, or Firm* — Xsensus LLP

(57) ABSTRACT

An information processing system includes a terminal and an information processing apparatus. The terminal transmits a mail. The information processing apparatus receives the mail. The receiving of the mail is to be a trigger to execute a job. The information processing apparatus performs verification of the mail based on customer information associated with a source address of the mail. The information processing apparatus determines whether to execute the job based on a result of the verification.

7 Claims, 13 Drawing Sheets

(56) References Cited

U.S. PATENT DOCUMENTS

| | | |
|---|---|---|
| 2017/0017442 A1 | 1/2017 | Ishii et al. |
| 2017/0075635 A1 | 3/2017 | Maemura et al. |
| 2017/0025751 A1 | 9/2017 | Kuroyanagi et al. |
| 2017/0346981 A1 | 11/2017 | Hayashi |
| 2018/0267753 A1 | 9/2018 | Asakimori et al. |
| 2019/0278630 A1 | 9/2019 | Kuroyanagi et al. |

* cited by examiner

FIG. 5

| CUSTOMER ID | MAIL ADDRESS | ROLL |
|---|---|---|
| T1129001 | admin123@yyyy.co.jp | ADMINISTRATOR |
| T1129001 | 224428abc@yyyy.co.jp | STANDARD USER |
| T1129001 | 334428abc@yyyy.co.jp | STANDARD USER |
| T1129001 | 434428abc@yyyy.co.jp | STANDARD USER |
| T1129001 | 534428abc@yyyy.co.jp | STANDARD USER |
| T9983241 | taro_999@xxxx.com | ADMINISTRATOR |
| T9983241 | aadfbce@xxxx.com | STANDARD USER |
| T9983241 | bbaadfbce@xxxx.com | STANDARD USER |
| T9983241 | cccbce@xxxx.com | STANDARD USER |
| T9983241 | ddddfbce@xxxx.com | STANDARD USER |
| ... | ..... | ... |

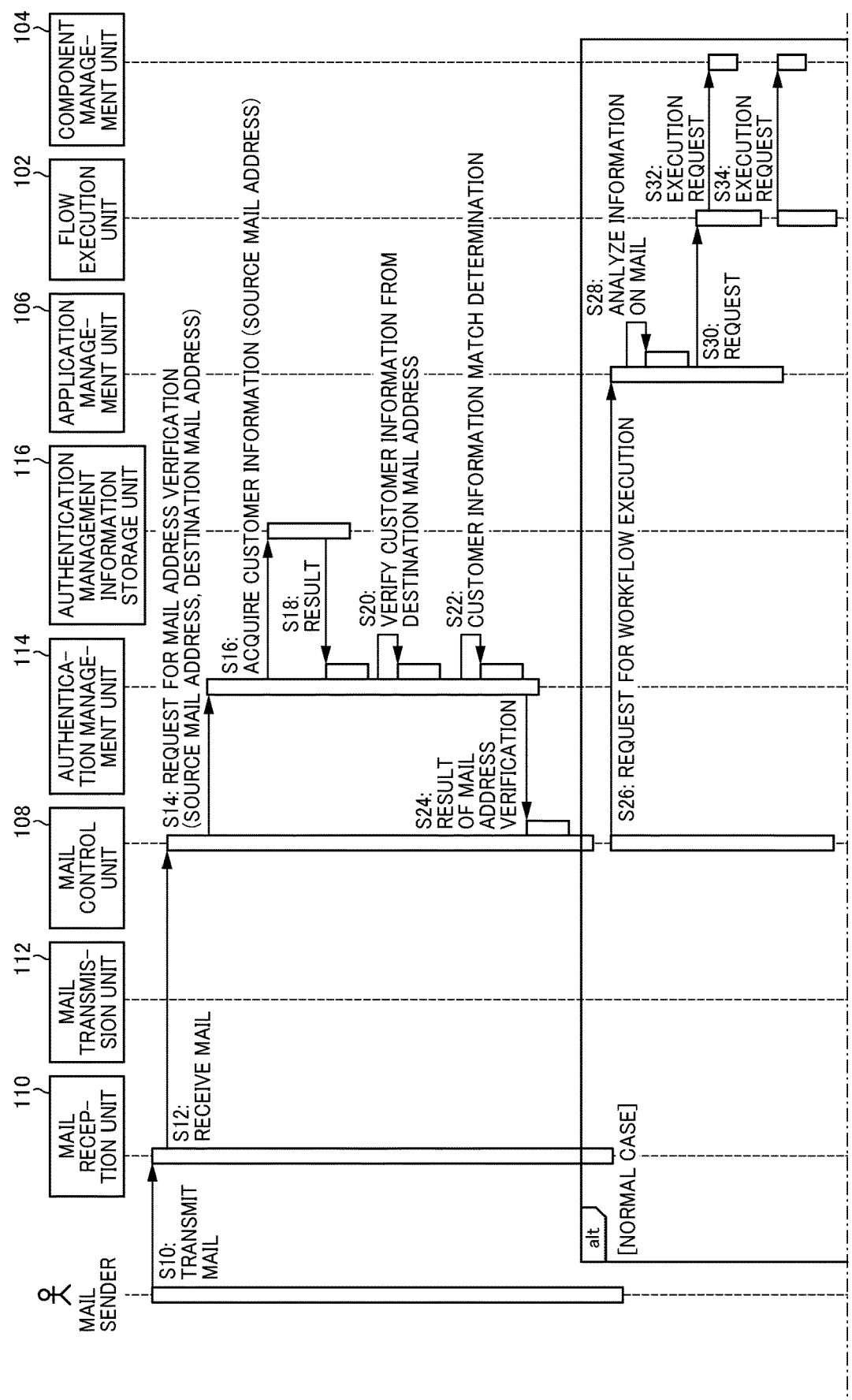

FIG. 10

| CUSTOMER ID | WORKFLOW ID |
|---|---|
| T1129001 | scan55983551 |
| T1129001 | scan55988871 |
| T1129001 | print86443113 |
| T9983241 | scan00894441 |
| T9983241 | print98899912 |
| T9983241 | print00000111 |
| ... | ..... |

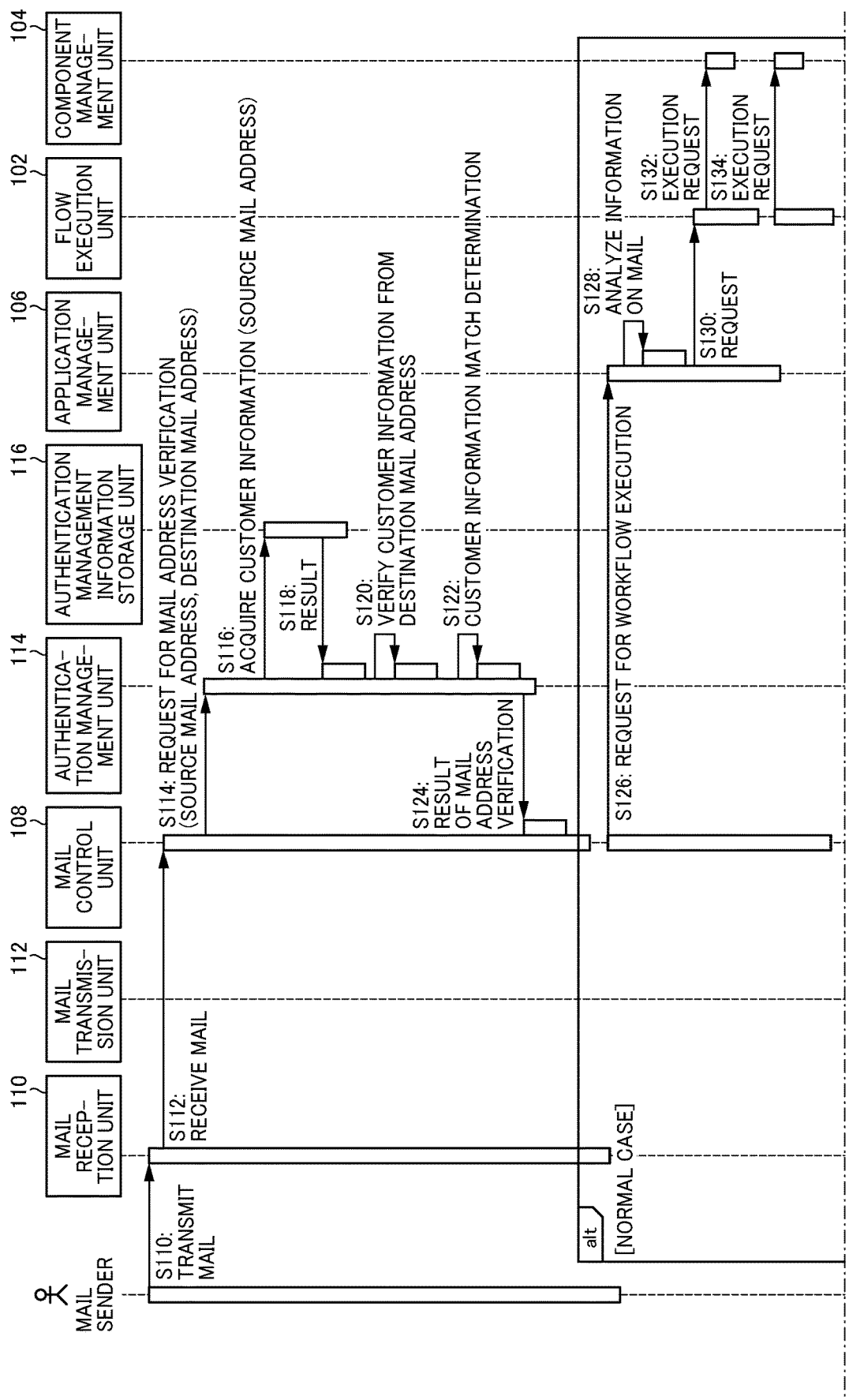

FIG. 12

```
======================================
Dear Administrator

This is yyy mail job submission system.
You have received a number of mails from mail addresses that
are not registered in yyy mail job submission system, which you use.
If you have any questions for use of the system, please contact us.

xxxx-xxxx-xxxxxx

======================================
```

INFORMATION PROCESSING SYSTEM TO EXECUTE A PARTICULAR WORKFLOW IN RESPONSE TO RECEIVING MAIL

CROSS-REFERENCE TO RELATED APPLICATION

This patent application is based on and claims priority pursuant to 35 U.S.C. § 119(a) to Japanese Patent Application No. 2019-205609, filed on Nov. 13, 2019, in the Japan Patent Office, the entire disclosure of which is hereby incorporated by reference herein.

BACKGROUND

Technical Field

Embodiments of the present disclosure relate to an information processing system, an information processing apparatus, and an information processing method.

Related Art

In recent years, various cloud services are provided by cloud computing or the like. Examples of the cloud services provided by cloud computing include a mail service, a storage service, and a facsimile transmission service. In addition, services to execute a processing flow such as a workflow are provided. Such a service is provided by defining a type of services such as an image processing service and a delivery processing service and defining a processing order of each service to enable execution of a processing flow such as a workflow.

There is a technique for executing a processing flow in response to an occurrence of at least one of various events, such as sending a mail, sending a facsimile, and storing an electronic file in a folder, as a condition.

SUMMARY

An exemplary embodiment of the present disclosure includes an information processing system including a terminal and an information processing apparatus. The terminal transmits a mail. The information processing apparatus receives the mail. The receiving of the mail is to be a trigger to execute a job. The information processing apparatus performs verification of the mail based on customer information associated with a source address of the mail. The information processing apparatus determines whether to execute the job based on a result of the verification.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is an illustration of a configuration of an example of authentication management information, according to an embodiment of the disclosure;

FIG. 6, which includes FIG. 6A and FIG. 6B, is a sequence diagram illustrating an example of a process performed by a service provision system according to a first embodiment of the disclosure;

FIG. 8, which includes

FIG. 10 is an illustration of an example configuration of an example of information that associates customer information and workflow IDs, according to an embodiment of the disclosure;

FIG. 11, which includes FIG. 11A and FIG. 11B, is a sequence diagram illustrating an example of a process performed by a service provision system according to the third embodiment of the disclosure; and FIG. 12 is an image diagram of an example of an error mail transmitted to a mail address of an administrator, according to an embodiment of the disclosure.

Figure 1:
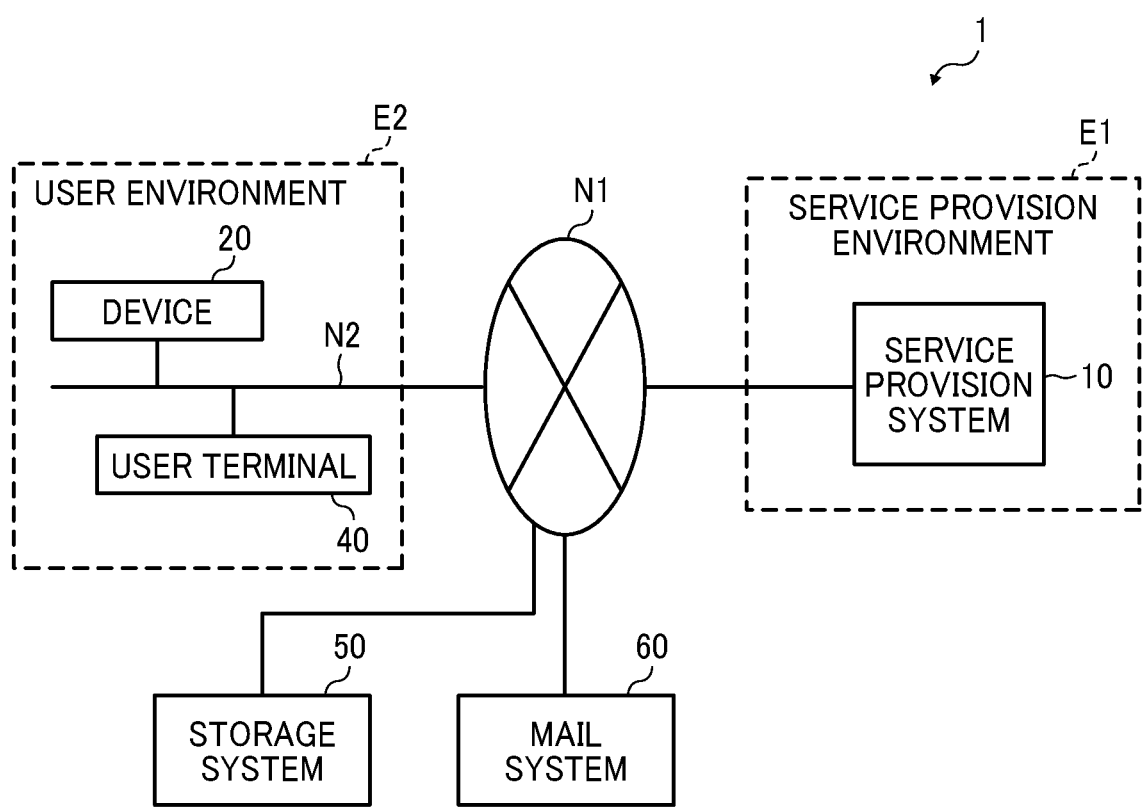
FIG. 1 is a diagram illustrating an example of a system configuration of an information processing system according to an embodiment of the disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

A description is given of several embodiments of the present disclosure with reference to drawings.

First Embodiment

System Configuration

An information processing system 1 according to a present embodiment is described below with reference to FIG. 1. FIG. 1 is a diagram illustrating an example of a system configuration of the information processing system 1 according to the present embodiment. As illustrated in FIG. 1, the information processing system 1 includes a service provision environment E1, a user environment E2, which are connected to communicate each other via a wide area network N1 such as the Internet. Further, the service provision environment E1 and the user environment E2 are connected to a storage system 50 and a mail system 60 via the network N1 for communication.

The storage system 50 and the mail system 60 are computer systems that provide a storage service and a mail service, respectively. The storage service is a cloud service that provides functions of a storage server, such as offering storage space. The mail service is a cloud service that provides functions of a mail server, such as mail exchange or mail transfer.

The service provision environment E1 is a system environment of a service provider that provides services in cooperation with an external service such as a cloud service through the network N1. In the following description of the present embodiment, a cloud service is used as one of the specific examples of the external services, however, the external service is not limited to the cloud service. The present embodiment may be applied to other various external services through a network. Examples of the external services include a service provided by an application service provider (ASP), and a Web service.

The service provision environment E1 includes a service provision system 10. The service provision system 10 is implemented by at least one information processing apparatus (computer). The service provision system 10 provides a device 20 or a user terminal 40, each of which is described later, with predetermined services through the network N1.

For example, in response to a trigger that is an occurrence of a predetermined event, the service provision system 10 provides a service that performs optical character recognition (OCR) processing on an electronic file specified by the device 20 or the user terminal 40 and delivers (uploads) the electronic file to the storage system 50. The service described above may be referred to as an "OCR delivery service" hereinafter.

However, the service described above is one example of the services provided by the service provision system 10, and the service provision system 10 may provide any other suitable services. For example, in response to a trigger that is an occurrence of a predetermined event, the service provision system 10 may provide a service that converts an electronic file specified by the device 20 or the user terminal 40 to a predetermined data format and deliver the electronic file to the storage system 50. In addition, for example, in response to a trigger that is an occurrence of a predetermined event, the service provision system 10 may provide a service that converts an electronic file specified by the device 20 or the user terminal 40 to a predetermined data format and deliver the electronic file as an electronic mail.

As described heretofore, the service provision system 10 according to the present embodiment provides services in response to a trigger that is an occurrence of a predetermined event. In the embodiment of the disclosure, an example of such an event includes transmitting a mail to a predetermined mail address. In other words, the service provision system 10 provides various services such as the OCR delivery service using the mail service provided by the service provision system 10 or the mail system 60.

The user environment E2 is, for example, a system environment of a user (service user) who uses one of the services provided by the service provision system 10. In the user environment E2, one or more devices 20 and user terminals 40 are connected for communication through a network N2 such as a LAN (Local Area Network).

Each of the device 20 and the user terminal 40 according to the present embodiment may be any device that has a communication function to send a mail to a predetermined mail address. The device 20 includes, for example, an image forming apparatus, a projector (PJ), an interactive white board (IWB), which is an electronical whiteboard with mutual communication capability, an output device such as a digital signage, a head-up display (HUD) device, an industrial machine, an imaging device, a sound collecting device, a medical device, a networked home appliance, and a connected car. The user terminal 40 includes, for example, a laptop personal computer (PC), a mobile phone, a smartphone, a tablet terminal, a game machine, a personal digital assistant (PDA), a digital camera, a wearable PC, and a desktop PC.

With the device 20 or the user terminal 40, the various services provided by the service provision system 10 are available for the user.

The configuration of the information processing system 1 illustrated in FIG. 1 is an example. The information processing system 1 illustrated in FIG. 1 is merely one of several computing environments that implement the one or more embodiments of the present disclosure.

In some embodiments, service provision system 10 includes multiple computing devices, such as a server cluster. The multiple computing devices are configured to communicate with one another through any type of communication link, including a network, a shared memory, etc., and perform processes disclosed herein. The components of the service provision system 10 may be combined into one information processing apparatus or may be divided into a plurality of information processing apparatuses.

In addition, regarding the configuration of the information processing system 1 illustrated in FIG. 1, a part of the one or more information processing apparatuses that implements the service provision system 10 may be included in the user environment E2, for example.

Further, at least one of the storage system 50 and the mail system 60 may be included in the service provision environment E1 or the user environment E2. In other words, at least one of the storage service and the mail service may be provided by the service provider or the service user.

Furthermore, two or more of the storage systems 50 or two or more of the mail systems 60 may be connected to the service provision environment E1 and the user environment E2 for communication. For example, the service provision system 10 may be connected to communicate with a storage system 50A that provides a storage service whose external service name is "Storage A" and a storage system 50B that provides a storage service whose external service name is "Storage B".

Hardware Configuration

Hardware Configuration of Computer

Figure 2:
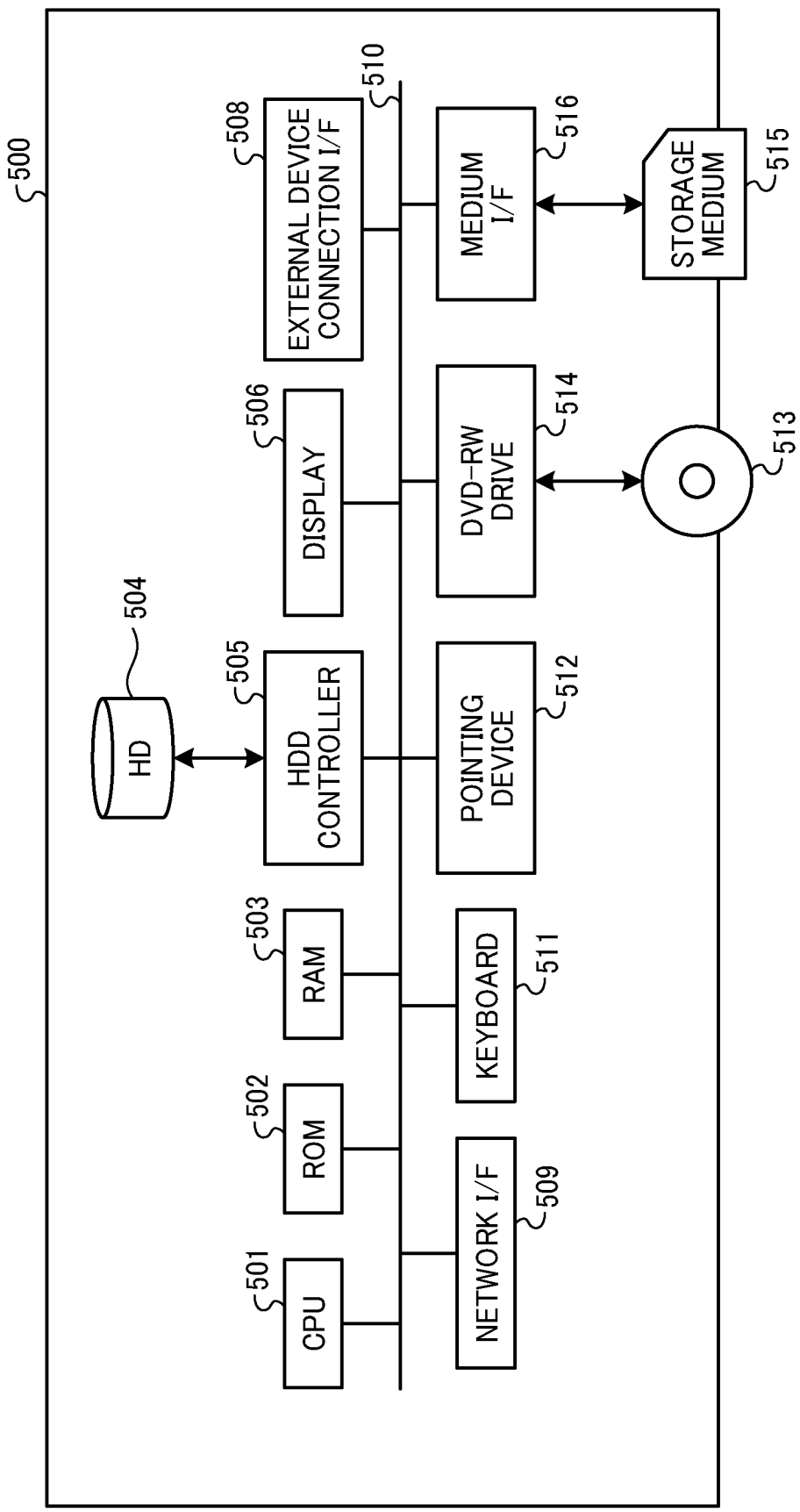
FIG. 2 is a block diagram illustrating an example of a hardware configuration of a computer, according to an embodiment of the disclosure.

The service provision system 10 and the user terminal 40 illustrated in FIG. 1 are implemented by, for example, a computer 500 having a hardware configuration as illustrated in FIG. 2. FIG. 2 is a block diagram illustrating an example of a hardware configuration of a computer according to the present embodiment.

As illustrated in FIG. 2, the computer 500 includes a central processing unit (CPU) 501, a read only memory (ROM) 502, a random access memory (RAM) 503, a hard disk (HD) 504, a hard disk drive (HDD) controller 505, a display 506, an external device connection interface (I/F)

508, a network I/F 509, a data bus 510, a keyboard 511, a pointing device 512, a digital versatile disk rewritable (DVD-RW) drive 514, and a medium I/F 516.

Among these elements, the CPU 501 controls entire operation of the computer 500 according to a program. The ROM 502 stores a program such as an initial program loader (IPL) used for driving the CPU 501. The RAM 503 is used as a work area for the CPU 501. The HD 504 stores various data such as a program. The HDD controller 505 controls reading and writing of various data from and to the HD 504 under control of the CPU 501.

The display 506 displays various information such as a cursor, menu, window, character, or image. The external device connection I/F 508 is an interface that connects the computer 500 to various external devices. Examples of the external devices include, but not limited to, a universal serial bus (USB) memory and a printer. The network I/F 509 is an interface for performing data communication using the network 18. Examples of the data bus 510 include, but not limited to, an address bus and a data bus, which electrically connects the components such as the CPU 501 with one another.

The keyboard 511 is one example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading and writing (storing) of data from and to a storage medium 515 such as a flash memory.

With the hardware configuration of the computer 500 as illustrated in FIG. 2, each of the service provision system 10 and the user terminal 40 according to the present embodiment executes various types of processing as described later. The hardware configuration of the device 20 varies depending on the type of the device 20. For example, when a type of the device 20 is an image forming apparatus, the hardware configuration is that of the image forming apparatus. The same applies to another type of device 20.

Functional Configuration

Figure 3:
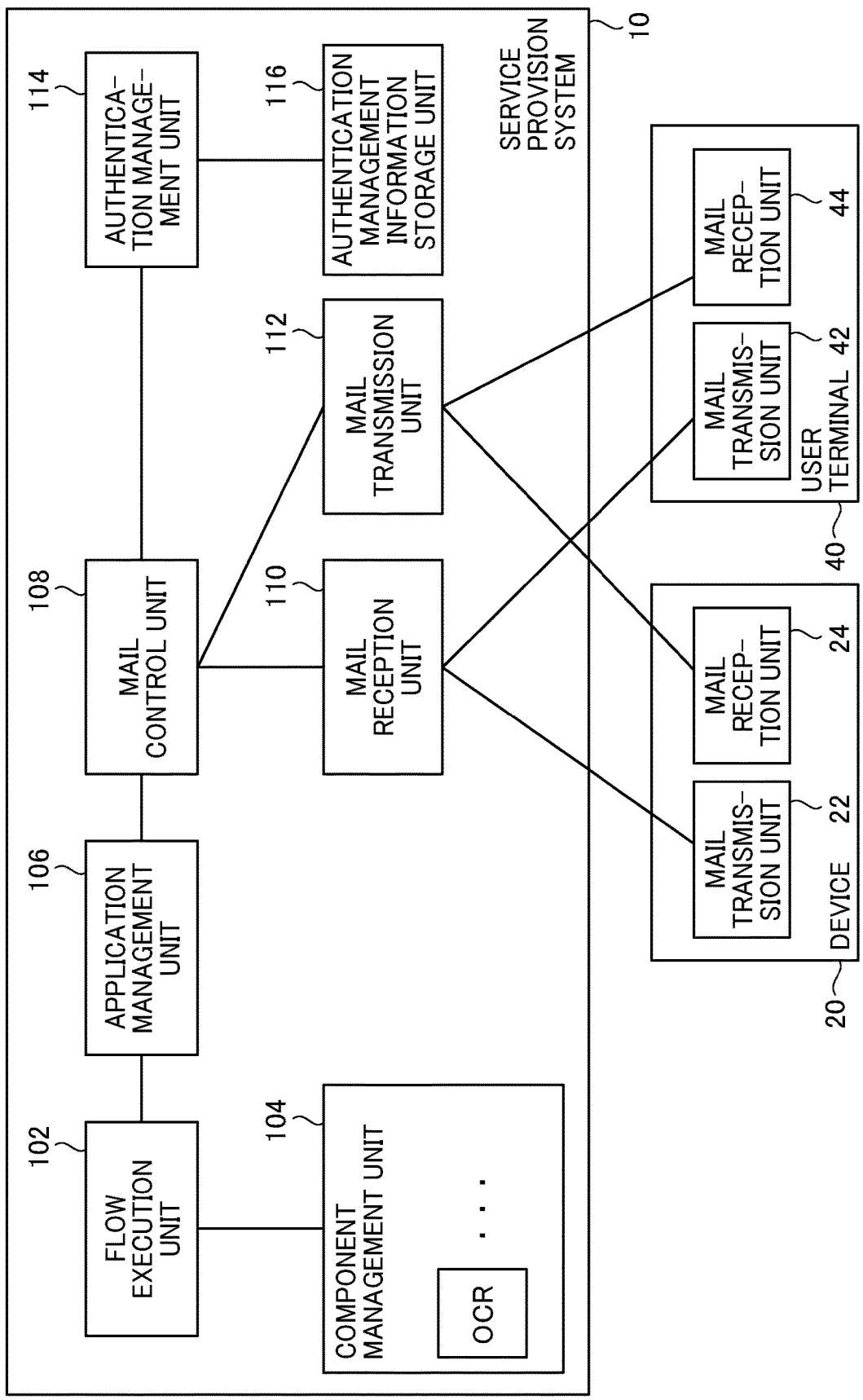
FIG. 3 is a block diagram illustrating an example of a functional configuration of a service provision system, a device, and a user terminal according to an embodiment of the disclosure.

A description is given of functional configurations of the service provision system 10, the device 20, and the user terminal 40 according to the present embodiment with reference to FIG. 3. FIG. 3 is a block diagram illustrating an example of a functional configuration of the service provision system 10, the device 20, and the user terminal 40 according to the first embodiment of the disclosure.

The service provision system 10 illustrated in FIG. 3 includes a flow execution unit 102, a component management unit 104, an application management unit 106, a mail control unit 108, a mail reception unit 110, a mail transmission unit 112, an authentication management unit 114, and an authentication management information storage unit 116. Each of the functional units of the service provision system 10 and the user terminal 40 illustrated in FIG. 3 is implemented by a processing executed by the CPU 501 according to one or more programs installed on the computer 500, which implements each of the service provision system 10 and the user terminal 40. In addition, each of the functional units of device 20 illustrated in FIG. 3 is implemented by processing executed by a CPU according to one or more programs installed on the hardware configuration of an image forming apparatus, which implements the device 20, for example.

The authentication management information storage unit 116 may be implemented by using the HD 504, for example. The authentication management information storage unit 116 may be implemented by using a storage device connected to the service provision system 10 through the network N1.

The flow execution unit 102 executes a series of processes (workflow) according to processing flow information. A workflow is implemented by combining components each of which implements a corresponding process. Each component is implemented by, for example, a program or a module that provides a predetermined function. The component is defined by, for example, a class or a function. Each component has independent responsibility. For example, one component is responsible for OCR processing, while another component is responsible for accessing external services. Further, the component management unit 104 manages the components that is a processing unit of the workflow.

The application management unit 106 analyzes a mail address to acquire a tenant identification (ID) (customer ID) and an application ID (workflow ID) and uses a result of the acquisition to cause the flow execution unit 102 to execute the workflow. The mail reception unit 110 receives a mail, which is a trigger of a workflow. The mail reception unit 110 may transmit a mail received by the mail system 60 from the mail system 60 to the mail reception unit 110 by Application Programming Interface (API) as illustrated in FIG. 4, for example.

Figure 4:
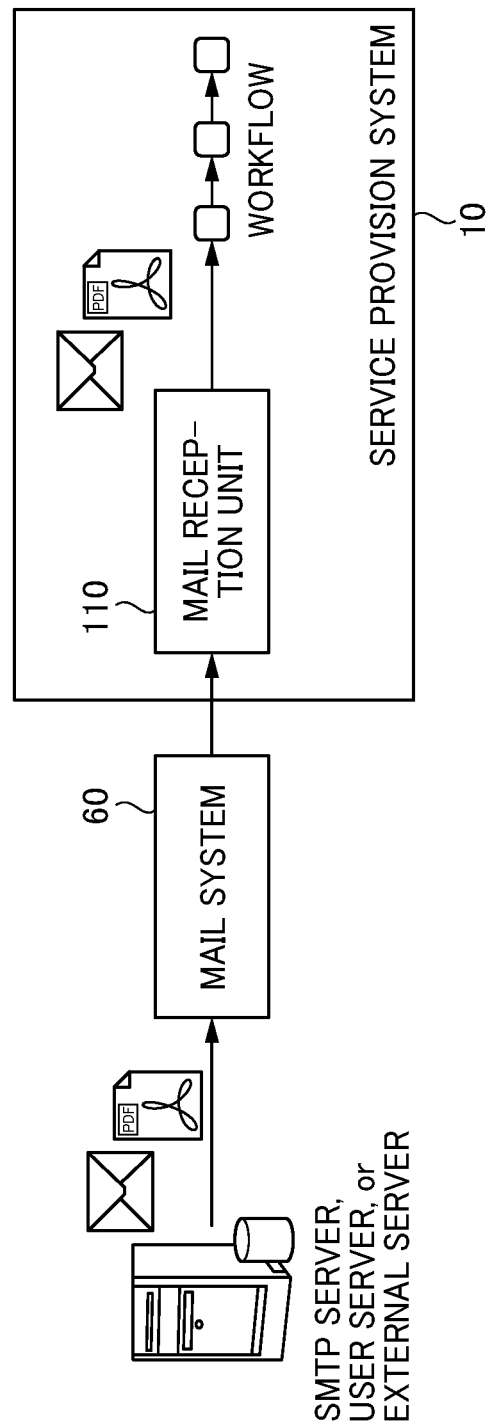
FIG. 4 is an illustration of an example of a use scenario of an external mail system, according to an embodiment of the disclosure.

FIG. 4 is an illustration of an example of a use scenario of an external mail system, according to an embodiment. In the example of FIG. 4, a mail is transmitted to the mail reception unit 110 by calling the API of service provision system 10 using a mail receiving service (e.g., SendGrid) of the mail system 60.

The mail transmission unit 112 sends a mail to the device 20 or the user terminal 40. The mail control unit 108 controls the mail reception unit 110 or the mail transmission unit 112 to receive or transmit mail (control mail delivery and reception). The mail control unit 108 transmits information on a mail (a mail address of transmission source, a mail address of destination, etc.) to the authentication management unit 114 to request for a mail address verification and receives a mail address verification result. The mail control unit 108 determines whether to execute the workflow based on the mail address verification result.

The authentication management unit 114 performs processing such as analyzing information related to authentication or verification or verifying information related to the mail. The authentication management information storage unit 116 stores authentication management information as illustrated in FIG. 5. FIG. 5 is an illustration of a configuration of an example of authentication management information, according to the present embodiment. In the authentication management information illustrated in FIG. 5, a customer ID, a mail address, and a role are associated with each other for each record.

An item, "customer ID", is an example of information that uniquely identifies one of various groups such as, for example, a company, a school, a party, an organization and a department to which a service user or an administrator belongs. Another item, "mail address", is a mail address of a user (service user or administrator) who belongs to the group identified by a customer ID. Another item "role"

includes "standard user" that is set when a user identified by the mail address is a service user and "administrator" that is set when a user is an administrator.

With the authentication management information illustrated in FIG. 5, the mail address of each service user or each administrator who belongs to a group identified by a customer ID is identifiable.

Process

A detailed description is given below of a process performed by the information processing system 1 according to the first embodiment. In the following description, transmission of a mail that is a trigger of a workflow is performed with the user terminal 40 by a user (mail sender).

Figure 6B:
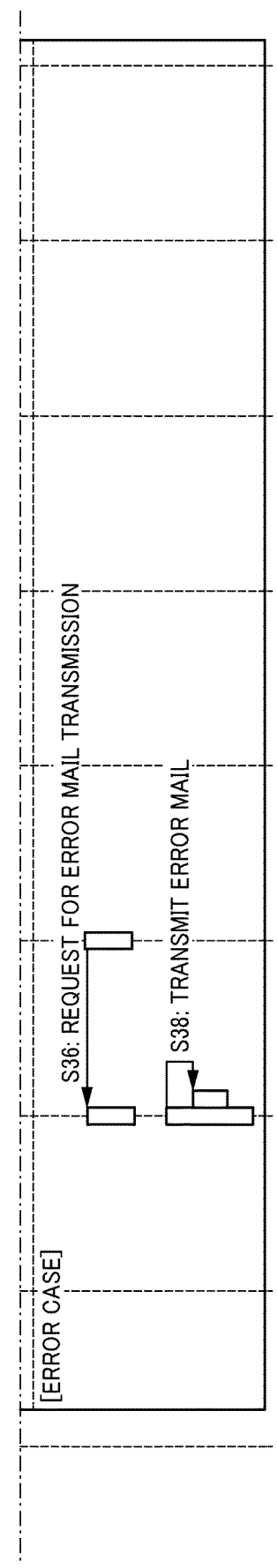

FIG. 6, which includes FIG. 6A and FIG. 6B, is a sequence diagram illustrating an example of a process performed by the service provision system according to the first embodiment. In the service provision system 10 according to the first embodiment, transmission of a mail to a predetermined destination mail address is a trigger of the workflow.

In S10, a user operates the user terminal 40 to generate a mail and then requests for transmission of the mail, which is to be a trigger of a workflow. The mail transmission unit 42 transmits the mail, which is to be the trigger of the workflow, to the mail reception unit 110 of the service provision system 10. The mail reception unit 110 of the service provision system 10 receives the mail that is a trigger of the workflow.

In S12, the mail reception unit 110 transmits the received mail to the mail control unit 108. In S14, the mail control unit 108 requests the authentication management unit 114 for a mail address verification by designating a source mail address and a destination mail address, which are mail addresses related to the mail transmitted from the mail reception unit 110. More specifically, the source mail address is a mail address of transmission source of the received mail, and destination mail address is a mail address of transmission destination of the received mail.

In S16, the authentication management unit 114 compares the source mail address of the mail received from the mail control unit 108 and an item of "mail address" of the authentication management information (illustrated in FIG. 5) stored in the authentication management information storage unit 116.

In S18, when the source mail address of the received mail is registered in the item of "mail address" in the authentication management information, the authentication management unit 114 acquires a customer ID that is corresponding to the source mail address in the authentication management information, as customer information. The customer ID is registered in an item of "customer ID" in the authentication management unit.

Figure 7:
FIG. 7 is an illustration of an example of a configuration of a destination mail address in which a customer identification (ID) is embedded, according to an embodiment of the disclosure.

In S20, the authentication management unit 114 verifies the destination mail address of the received mail and acquires a customer ID embedded as illustrated in FIG. 7 as customer information of the destination mail address. FIG. 7 is an illustration of an example of a configuration of a destination mail address in which a customer ID is embedded. In the example of FIG. 7, the customer ID is directly embedded in the destination mail address. As another example, any other identification information uniquely associated with the customer ID may be embedded in the destination mail address, and the customer ID associated with the identification information may be acquired from a database (DB) or the like.

In S22, the authentication management unit 114 performs the verification by determining whether the customer information matches. This processing may be referred to as a customer information match determination. In the customer information match determination, the authentication management unit 114 determines whether the customer information (customer ID) associated with the source mail address acquired in S18 is identified with, or match, the customer information (customer ID) associated with the destination mail address acquired in S20.

In S24, the authentication management unit 114 transmits to the mail control unit 108 a result of the mail address verification. The result of the mail address verification indicates whether the customer information associated with the source mail address acquired in S18 is identified with, or match, the customer information associated with the destination mail address acquired in S20.

When the result of the mail address verification indicates that the customer information of the source mail address acquired in S18 is identified with, or match, the customer information of the destination mail address acquired in S20, the mail control unit 108 performs the processing of S26 to S34, which is a normal processing, or processing for a normal (usual) case. When the result of the mail address verification indicates that the customer information of the source mail address acquired in S18 is not identified with, or does not match, the customer information of the destination mail address acquired in S20, the mail control unit 108 performs the processing of S36 to S38, which is processing for an error, or processing for an error case.

In S26 to S34 in the normal case, the mail control unit 108 requests the application management unit 106 for execution of the workflow according to the received mail (S26). The application management unit 106 analyzes information on the mail to acquire the customer information and the workflow ID based on the destination mail address illustrated in FIG. 7 (S28), and transmits to the flow execution unit 102 a flow execution request corresponding to the workflow ID (S30). The flow execution unit 102 executes the workflow by requesting the component management unit 104 to perform processing according to the workflow ID, by transmitting an execution request (S32, S34).

In the processing of S36 to S38 in the error case, the mail control unit 108 requests the mail transmission unit 112 for an error mail transmission to cause the mail transmission unit 112 to transmit an error mail. The destination of the error mail may be the source mail address, a mail address of the administrator, which is identified based on the customer information of the source mail address, or a mail address of the administrator, which identified based on the customer information of the destination mail address.

As described above, in a case where the trigger that is an occurrence of an event to execute a workflow (trigger event) is transmission of a mail to a predetermined mail address, the service provision system 10 according to the present embodiment permits the execution of the workflow when the source mail address and the destination mail address are associated with the same customer information registered in the authentication management information. Otherwise, the workflow is not executed. That is, a sender using the source address associated with the customer information corresponding to the mail and a receiver using the destination address associated with the customer information corresponding to the mail are customers who are authorized to transmit or receive the mail in the information processing system 1.

Accordingly, in the present embodiment, in the information processing system 1, which executes a workflow in response to an occurrence of a trigger event that is a transmission of a mail to a predetermined mail address, the workflow is not executed, for example, when a source mail address indicates a suspicious sender that is not registered in the service provision system 10, resulting in improving security.

Second Embodiment

The second embodiment is different from the first embodiment in the process of identifying the customer information of the destination mail address. Since the second embodiment is substantially the same as the first embodiment in a part, the redundant description is omitted below.

Figure 8A:
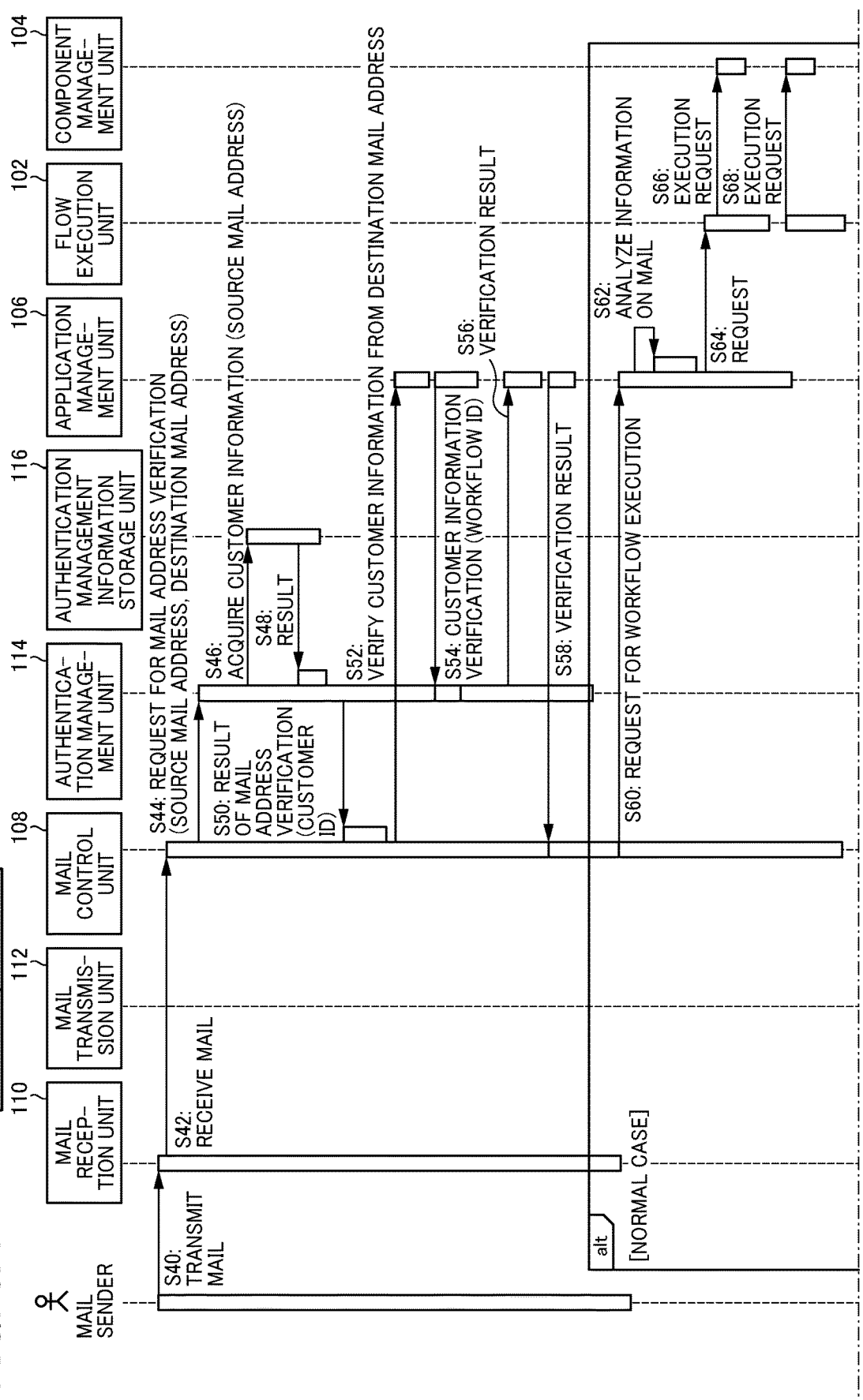
FIG. 8A and FIG. 8B, is a sequence diagram illustrating an example of a process performed by a service provision system according to a second embodiment of the disclosure.
Figure 8B:
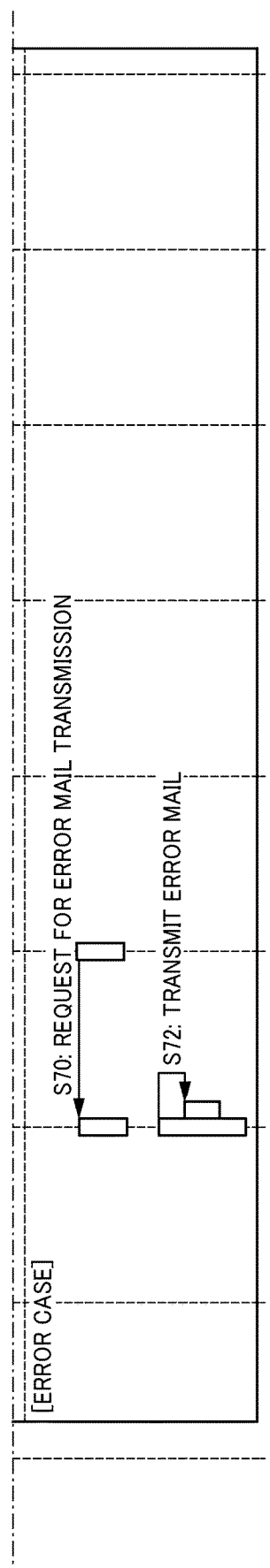

FIG. 8, which includes FIG. 8A and FIG. 8B, is a sequence diagram illustrating an example of a process performed by a service provision system according to the second embodiment. Since the processing in S40 through S48 is the same as the processing in S10 through S18 in FIG. 6A, description thereof is omitted.

Figure 9:
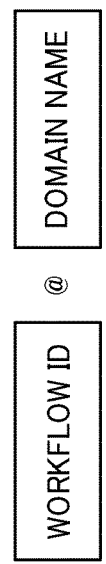
FIG. 9 is an illustration of an example of a destination mail address in which the workflow ID is embedded, according to an embodiment of the disclosure.

In S50, the authentication management unit 114 transmits the customer information (customer ID) of the source mail address of the received mail to the mail control unit 108. In S52, the mail control unit 108 transmits the destination mail address of the received mail to the application management unit 106, and requests for a verification of the customer information based on the destination mail address. In S54, the application management unit 106 verifies the received destination mail address and acquires a workflow ID embedded as illustrated in FIG. 9, for example. FIG. 9 is an illustration of an example of a destination mail address in which the workflow ID is embedded, according to the present embodiment.

The application management unit 106 transmits the acquired workflow ID to the authentication management unit 114 and requests for the verification of the customer information. The authentication management unit 114 identifies a customer ID corresponding to the received workflow ID as customer information of the destination mail address using the information that associates customer information (customer IDs) and workflow IDs as illustrated in FIG. 10. FIG. 10 is an illustration of an example configuration of an example of information that associates customer information and workflow IDs, according to the present embodiment.

In S56, the authentication management unit 114 transmits the customer information of the identified destination email address to the application management unit 106 as a result of the verification. Further, in S58, the application management unit 106 transmits the customer information of the destination mail address received from the authentication management unit 114 to the mail control unit 108 as a result of the verification. The mail control unit 108 verifies whether the customer information associated with the source mail address acquired in S50 is identified with, or match, the customer information associated with the destination mail address acquired in S58. When the result of the mail address verification indicates that the customer information associated with the source mail address acquired in S50 is identified with, or match, the customer information associated with the destination mail address acquired in S58, the mail control unit 108 performs the processing of steps S60 to S68, which is a normal processing, or processing for a normal case. The processing of S60 to S68 in the normal case is substantially the same as that of S26 to S34 illustrated FIG. 6A.

When the result of the mail address verification indicates that the customer information associated with the source mail address acquired in S50 is not identified with, or does not match, the customer information associated with the destination mail address acquired in S58, the mail control unit 108 performs the processing of S70 to S72, which is processing for an error, or an error case. The processing of error system steps S70 to S72 is substantially the same as that of S36 to S38 illustrated in FIG. 6A.

As described in the second embodiment, the processing of identifying the customer information of the destination mail address may be implemented by a plurality of methods. The processing of identifying the customer information of the destination mail address may be appropriately changed, for use, according to an application configuration of the information processing system 1.

Third Embodiment

Processing in an error case, or processing for an error, according to the third embodiment is different from that according to the first and second embodiments. The processing in the error case according to the third embodiment may be applied to that according to first and second embodiments. Since the third embodiment is substantially the same as the first embodiment or the second embodiment in a part, the redundant description is omitted below.

Figure 11B:
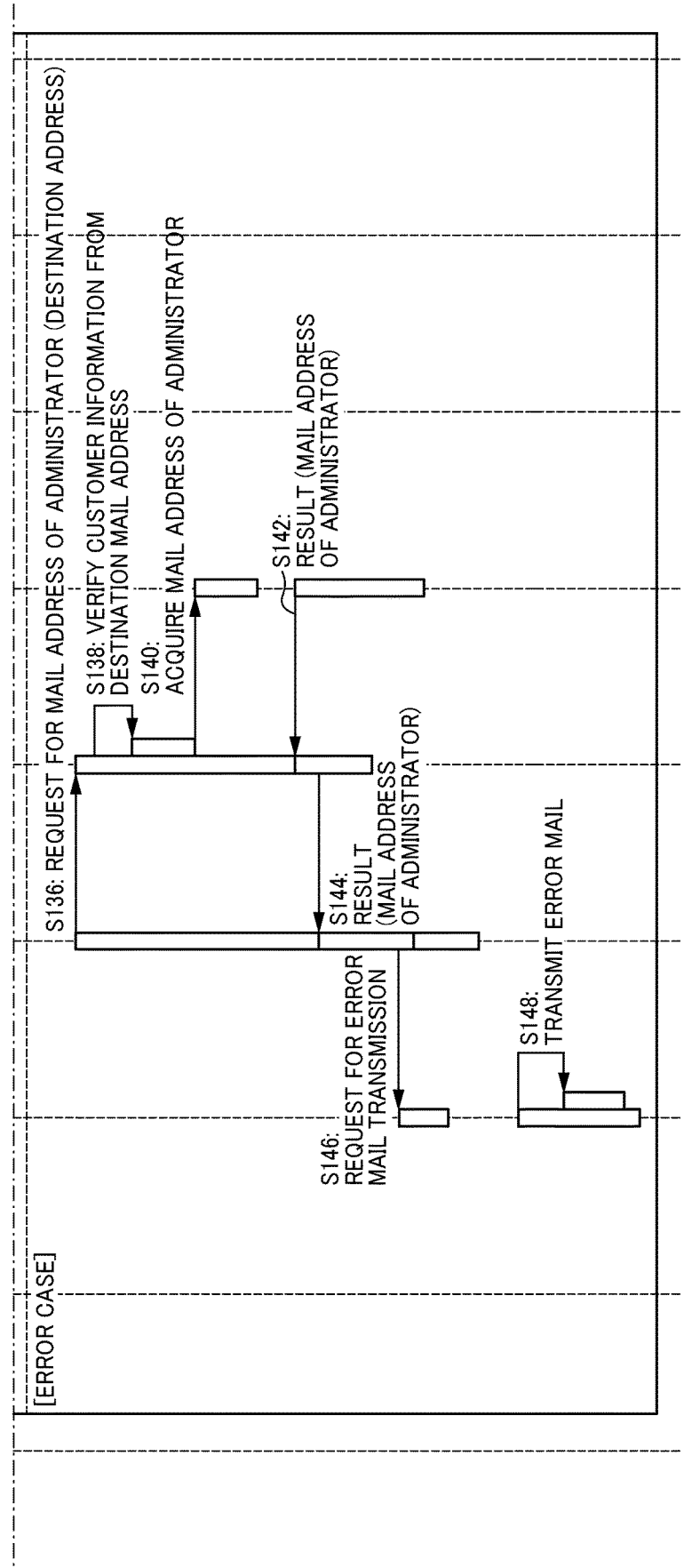

FIG. 11, which includes FIG. 11A and FIG. 11B, is a sequence diagram illustrating an example of a process performed by a service provision system according to the second embodiment. Since the processing of S110 to S134 is substantially the same as the processing of steps S10 to S34 illustrated in FIG. 6A, description thereof will be omitted.

Steps S136 to S148 are processing performed in an error case. In S136, the mail control unit 108 requests the authentication management unit 114 to obtain an administrator mail address by specifying the destination address.

In S138, the authentication management unit 114 verifies the designated destination mail address and acquires a customer ID embedded as illustrated in FIG. 7 as the customer information of the destination mail address. In S140 to S142, the authentication management unit 114 specifies the customer information of the acquired destination mail address and acquires the mail address of the administrator from the authentication management information illustrated in FIG. 5.

For example, in S138 to S144, when the customer ID is "T1129001", the authentication management unit 114 acquires the mail address of an administrator, "admin123@yyyy.co.jp", from the authentication management information illustrated in FIG. 5.

In S144, the authentication management unit 114 transmits the mail address of the administrator, which is acquired in S142, to the mail control unit 108. In S146, the mail control unit 108 transmits an error mail transmission request to the mail transmission unit 112 to causes the mail transmission unit 112 to transmit an error mail to the mail address of the administrator. In S148, the mail transmission unit 112 transmits the error mail such as illustrated in FIG. 12 to the mail address of the administrator. FIG. 12 is an image diagram of an example of an error mail transmitted to a mail address of an administrator.

A predetermined condition regarding frequency of receiving a mail having mismatched customer information for transmitting an error mail to the mail address of an administrator may be set. The predetermined condition regarding the frequency of receiving a mail having mismatched customer information includes a case in which the number of received mails having the mismatched customer information received within a predetermined period of time exceeds a predetermined number. The predetermined period of time and the predetermined number may be set by a user, an operator, or a designer in advance. The mismatched customer information means customer information related to the mail received is not identified with the customer information registered in advance. For example, 10 or more mails having the mismatched customer information are received within 5 minutes, an error mail is transmitted to the mail address of the administrator. When such a condition for transmitting an error mail to a mail address of an administrator is set, the mail control unit 108 manages the number of received mails having mismatched customer information received within a predetermined period for each customer ID and then performs processing of S146 to 148 in a case the condition is satisfied, in other words, the number of received mails exceeds the threshold set.

In this way, by transmitting such an error mail to the mail address of the administrator when the condition is satisfied, the system allows the administrator to be notified of that there is a high possibility of being attacked, thereby resulting in improving security.

In a conventional technique, when the processing flow is executed on condition that a mail is transmitted, a security regarding a case in which a user who is not authorized to execute the processing flow transmits a mail, is not taken into consideration.

An embodiment of the present disclosure has been made in view of the above points, and an object thereof is to improve security of a job executed in response to a trigger, that is receiving a mail.

According to the embodiment of the present disclosure, it is possible to improve security of a job executed in response to a trigger that is receiving a mail.

Any one of the above-described operations may be performed in various other ways, for example, in an order different from the one described above.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims. Each of the functions of the described embodiments may be implemented by one or more processing circuits or circuitry (processors). Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

It should be noted that in the above-described embodiment, a workflow, which is an example of a job, is described as an example, but the disclosure is not limited to the workflow. Further, a term of source mail address is replaceable with a term of source address in the disclosure. A term of destination mail address is replaceable with a term of destination address.

What is claimed is:

1. An information processing system, comprising:
a terminal configured to transmit a mail; and
an information processing apparatus configured to
receive the mail, the receiving of the mail being a trigger to execute a particular workflow,
perform a verification process on the received mail, based on customer information associated with a source address of the mail,
acquire, based on a destination address of the received mail, the particular workflow identifier identifying a particular workflow,
when the received mail is verified by the verification process, execute the particular workflow identified by the acquired particular workflow identifier,
acquire the customer information associated with the source address of the mail,
verify whether transmission of the mail, which is another trigger to execute the particular workflow, is performed by an authorized customer, and
receive the mail having the destination address, the destination address including the particular workflow identifier and a customer identifier.

2. The information processing system according to claim 1, wherein the information processing apparatus is further configured to
determine, in performing the verification process of the received mail, whether the customer information associated with the source address of the mail matches customer information associated with a destination address of the mail, and
determine to execute the particular workflow, when the determination indicates that the customer information associated with the source address of the mail matches the customer information associated with the destination address of the mail.

3. The information processing system according to claim 2,
wherein the information processing apparatus is further configured to determine not to execute the particular workflow, when the determination indicates that the customer information associated with the source address of the mail does not match the customer information associated with the destination address of the mail.

4. The information processing system according to claim 2,
wherein the information processing apparatus is further configured to transmit an error mail notifying an error, when the determination indicates that the customer information associated with the source address of the mail does not match the customer information associated with the destination address of the mail.

5. The information processing system according to claim 4,
wherein the information processing apparatus is further configured to transmit, to a mail address of an administrator, the error mail notifying the administrator of the error, when frequency of receiving a mail having mismatched customer information satisfies a predetermined condition, the mail having mismatched customer information being a mail of which the customer information associated with the source address does not match the customer information associated with the destination address.

6. An information processing apparatus, comprising:
circuitry configured to
- receive a mail, the receiving of the mail being a trigger to execute a particular workflow,
- perform a verification process on the received mail, based on customer information associated with a source address of the mail,
- acquire, based on a destination address of the received mail, the particular workflow identifier identifying a particular workflow,
- when the received mail is verified by the verification process, execute the particular workflow identified by the acquired particular workflow identifier,
- acquire the customer information associated with the source address of the mail,
- verify whether transmission of the mail, which is another trigger to execute the particular workflow, is performed by an authorized customer, and
- receive the mail having the destination address, the destination address including the particular workflow identifier and a customer identifier.

7. An information processing method, comprising:
- receiving a mail, the receiving of the mail being a trigger to execute a particular workflow;
- performing a verification process on the received mail, based on customer information associated with a source address of the mail;
- acquiring, based on a destination address of the received mail, the particular workflow identifier identifying a particular workflow;
- when the received mail is verified by the verification process, executing the particular workflow identified by the acquired particular workflow identifier;
- acquiring the customer information associated with the source address of the mail;
- verifying whether transmission of the mail, which is another trigger to execute the particular workflow, is performed by an authorized customer; and
- receiving the mail having the destination address, the destination address including the particular workflow identifier and a customer identifier.

* * * * *